US012637360B2

(12) United States Patent
Wang et al.

(10) Patent No.: US 12,637,360 B2
(45) Date of Patent: May 26, 2026

(54) METHOD FOR SEPARATING IRON ELEMENT IN BRINE AND APPLICATION THEREOF

(71) Applicant: BYD COMPANY LIMITED, Guangdong (CN)

(72) Inventors: Shengye Wang, Shenzhen (CN); Junlan Lian, Shenzhen (CN); Hongye Lin, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 545 days.

(21) Appl. No.: 18/090,683

(22) Filed: Dec. 29, 2022

(65) Prior Publication Data

US 2023/0212027 A1     Jul. 6, 2023

(30) Foreign Application Priority Data

Dec. 31, 2021     (CN) .......................... 202111682874.6

(51) Int. Cl.
*C01G 49/04*          (2006.01)
*C01G 49/00*          (2006.01)
(52) U.S. Cl.
CPC ......... *C01G 49/04* (2013.01); *C01G 49/0009* (2013.01); *C01P 2002/70* (2013.01); *C01P 2006/42* (2013.01)
(58) Field of Classification Search
CPC . C01G 49/04; C01G 49/0009; C01P 2006/42; C01P 2002/70
See application file for complete search history.

(56) References Cited

U.S. PATENT DOCUMENTS

| 7,763,221 B2 * | 7/2010 | Wallevik ............. C22B 23/0453 |
| | | 423/155 |
| 10,190,030 B2 * | 1/2019 | Harrison ................. E21B 43/25 |
| 2008/0069748 A1 * | 3/2008 | Lien .......................... C22B 3/22 |
| | | 423/150.1 |

(Continued)

FOREIGN PATENT DOCUMENTS

| CN | 85105994 A | 1/1987 |
| CN | 103011454 A | 4/2013 |
| CN | 103352122 A | 10/2013 |

(Continued)

OTHER PUBLICATIONS

Bond et al. (Reaction between ferrous iron and dissolved oxygen in brine, Industrial and Engineering Chemistry, 1952, vol. 44, No. 10, pp. 2435-2438) (Year: 1952).*

(Continued)

*Primary Examiner* — Youngsul Jeong
(74) *Attorney, Agent, or Firm* — Sheppard Mullin Richter & Hampton LLP

(57)          ABSTRACT

The present disclosure provides a method for separating iron element in brine and application thereof. The method for separating iron element in brine comprises: adding a pH adjusting agent to brine, to adjust pH of the brine to 6.0-7.0, and controlling the temperature of the brine to 75° C.-90° C.; introducing an oxygen-containing gas into the brine, to covert the iron element in the brine into magnetic iron oxide; and separating the magnetic iron oxide from the brine by magnetic adsorption to obtain an iron-removed brine.

7 Claims, 8 Drawing Sheets adding a pH adjusting agent to brine, to adjust pH of the brine to 6.0-7.0, and controlling the temperature of the brine to 75°C-90°C          100 introducing an oxygen-containing gas into the brine, to covert the iron element in the brine into magnetic iron oxide; and          200 separating the magnetic iron oxide from the brine by magnetic adsorption, to obtain an iron-removed brine.          300

(56) References Cited

U.S. PATENT DOCUMENTS

2021/0214820 A1     7/2021   Snydacker

FOREIGN PATENT DOCUMENTS

| CN | 103820640 A * | 5/2014 | .............. C22B 3/08 |
|----|---------------|--------|------|
| CN | 105858963 A | 8/2016 | |
| CN | 106830493 A | 6/2017 | |
| CN | 106848472 A | 6/2017 | |
| RU | 2209782 C2 | 8/2003 | |

OTHER PUBLICATIONS

Chaturvedi et al. (Removal of iron for safe drinking water, Desalination 303 (2012) 1-11) (Year: 2012).*
CN 103820640A_English translation (Year: 2014).*

* cited by examiner adding a pH adjusting agent to brine, to adjust pH of the brine to 6.0-7.0, and controlling the temperature of the brine to 75°C-90°C — 100 introducing an oxygen-containing gas into the brine, to covert the iron element in the brine into magnetic iron oxide; and — 200 separating the magnetic iron oxide from the brine by magnetic adsorption, to obtain an iron-removed brine. — 300

METHOD FOR SEPARATING IRON ELEMENT IN BRINE AND APPLICATION THEREOF

CROSS-REFERENCE TO RELATED APPLICATIONS

This application is based on and claims priority to and benefits of Chinese Patent Application No. 202111682874.6, filed on Dec. 31, 2021. The entire content of the above-referenced application is incorporated herein by reference.

FIELD

The present disclosure relates to the technical field of brine extraction process, and specifically to a method for separating iron element in brine and the application thereof.

BACKGROUND

Lithium plays an important role in the electronic, metallurgy, chemical, medicine and other fields. Lithium in nature mainly exists in lithium ores, salt lake brine, geothermal brine and seawater. For salt lake brine and geothermal brine, lithium can be extracted by the adsorbent method. However, the composition of brine is complex. In addition to lithium ions, brine also contains a variety of metal ions such as iron ions, magnesium ions, manganese ions, calcium ions and sodium ions, etc. The iron ions therein tend to form ferric hydroxide colloids in the lithium extraction process, causing degraded adsorption performance of the adsorbent, and greatly reduced lithium extraction efficiency of the adsorbent. Therefore, there is a need to provide a method for separating iron element suitable for the extraction process of lithium from brine, with which iron is separated out without causing loss of the lithium element in brine, to reduce the loss of the adsorbent, and ensure the efficient extraction of lithium in brine by the adsorbent, thereby achieving efficient lithium extraction.

SUMMARY

In view of this, the present disclosure provides a method for separating iron element in brine. In this method, the iron element in brine can be converted into magnetic iron oxide, and then the iron element is removed from the brine by magnetic separation technology. This method can not only fully retain the lithium element in the brine, but also allow the obtained iron-removed brine to be directly used in the extraction of lithium by the adsorption method. The method is compatible with the existing process conditions for lithium extraction from brine, and has good applicability.

In a first aspect, the present disclosure provides a method for separating iron element in brine, which includes:

adding a pH adjusting agent to brine to adjust pH of the brine to 6.0-7.0, and controlling the temperature of the brine to 75° C.-90° C.;

introducing an oxygen-containing gas into the brine, to covert the iron element in the brine into magnetic iron oxide; and separating the magnetic iron oxide from the brine by magnetic adsorption, to obtain an iron-removed brine.

In this method for separating iron element in brine provided in the present disclosure, the temperature and pH of the brine are adjusted, and then ferrous ions in the brine are reacted with an oxygen-containing gas to form magnetic iron oxide, to recover the ferrous ions in the form of magnetite (magnetic iron oxide). In this method, the iron element is separated from brine by magnetic separation technology, thus greatly improving the efficiency of solid-liquid separation. Moreover, this method can retain the lithium element in the brine, and the iron-removed brine obtained after the reaction can be directly used in the subsequent lithium extraction process. Thus, this method has good applicability.

In some embodiments of the present disclosure, the oxygen-containing gas includes oxygen or an oxygen-containing mixed gas.

In some embodiments of the present disclosure, the oxygen-containing gas includes oxygen molecules, and based on one mole of iron in the brine, the oxygen molecules are introduced in an amount of 250-540 mol.

In some embodiments of the present disclosure, based on one mole of iron in the brine, the oxygen molecules are introduced in a rate of 4.5-10 mol/min.

In some embodiments of the present disclosure, the pH of the brine is adjusted to 6.3-6.8.

In some embodiments of the present disclosure, the temperature of the brine is controlled to be 85° C.-90° C.

In some embodiments of the present disclosure, the pH adjusting agent comprises one or more of sodium hydroxide, potassium hydroxide or aqueous ammonia.

In some embodiments of the present disclosure, the method further includes: filtering the iron-removed brine, to obtain sodium chloride.

In some embodiments of the present disclosure, the brine includes geothermal brine.

In some embodiments of the present disclosure, the pH of the iron-removed brine is 4.5-6.0.

In a second aspect, the present disclosure provides a method for extracting lithium from brine using the method for separating iron element in brine described in the first aspect.

DETAILED DESCRIPTION

The technical solutions in the embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Geothermal brine is geothermal water including a variety of salts. Geothermal brine includes various metal ions, such as potassium ions, sodium ions, calcium ions, lithium ions, iron ions, magnesium ion and manganese ions, etc., and the anions therein mainly include chloride ions. Generally, the concentration of lithium ions in geothermal brine is 0.01%-0.028%, the concentration of iron ions is 0.07%-0.15%, the concentration of sodium ions is 6%-7.5%, the concentration of magnesium ions is 0.002%-0.01%, the concentration of manganese ions is 0.1%-0.2%, and the concentration of calcium ions is 2.0%-3.5%. It can be seen that the composition of brine is complex, and it is difficult to separate lithium ions from numerous metal ions in geothermal brine.

The existing methods for extracting lithium from brine mainly include adsorption and membrane separation. Adsorption has the advantages of simple process, and low cost. However, the presence of iron ions in brine affects the adsorption performance of the adsorbent. Iron ions are easy to form ferric hydroxide colloids under the conditions of adsorption of lithium ions by the adsorbent, and the ferric hydroxide colloids may adhere to the adsorbent surface and block the pores of the adsorbent, causing decreased adsorption sites in the adsorbent, even reducing the permeability of an adsorption tower or column, thus causing the failure of the adsorption tower/column. At present, wet iron removal includes jarosite methods, goethite methods, hematite methods and phosphate methods for iron removal. However, the above methods are not suitable for removing iron from brine systems. The composition of brine is complex, and a variety of precipitates or crystals may be produced during the iron removal process. These solids are mixed with the iron precipitate, and further separation and purification are required, thereby increasing the complexity and cost of iron recovery. Therefore, there is a need to provide a new method for separating iron elements in brine, with which iron is rapidly and efficiently recovered from the brine without affecting the lithium content in the brine, to ensure the smooth progress of the lithium extraction process from brine.

Figure 1:
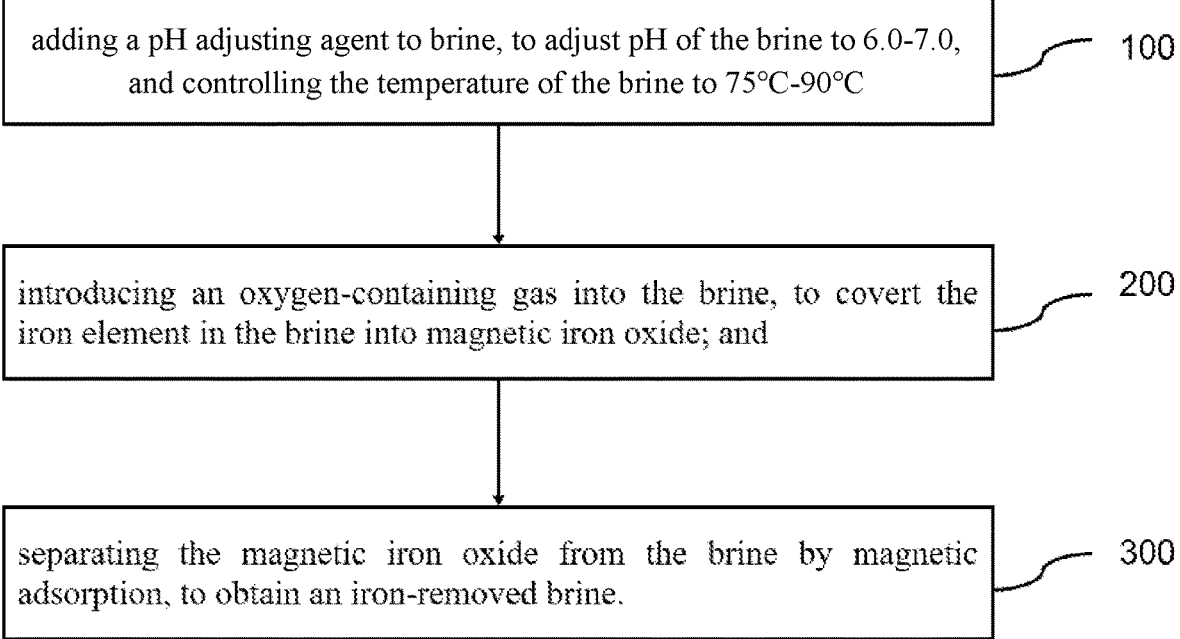
FIG. 1 shows a method for separating iron element in brine provided in an embodiment of the present disclosure.
Figure 2:
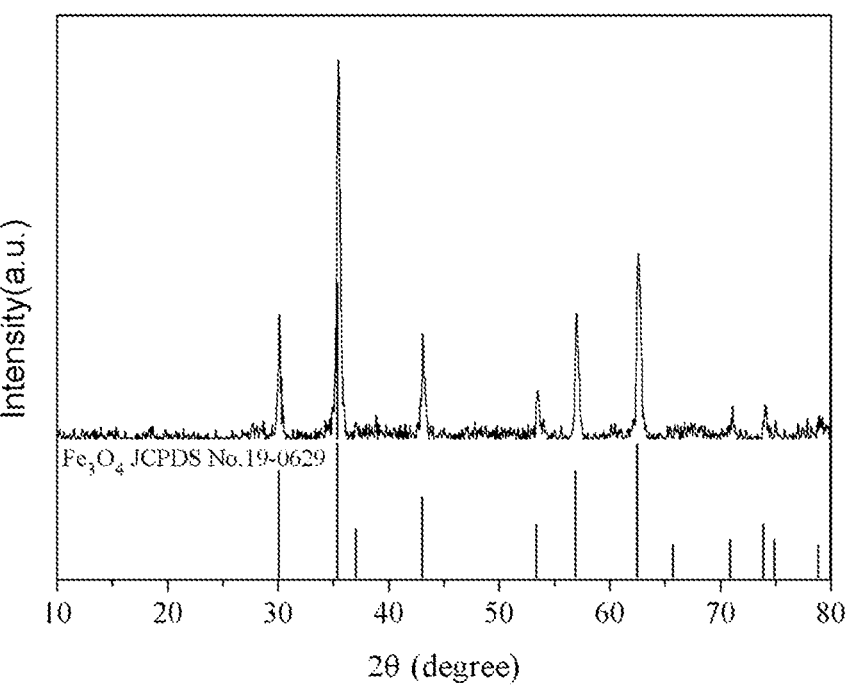
FIG. 2 is a diffraction pattern of a magnetite recovered in Example 1.

FIG. 1 shows a method for separating iron element in brine provided in an embodiment of the present disclosure. The method includes:

Step 100: adding a pH adjusting agent to brine, to adjust pH of the brine to 6.0-7.0, and controlling the temperature of the brine to 75° C.-90° C.;

Step 200: introducing an oxygen-containing gas into the brine, to covert the iron element in the brine into magnetic iron oxide; and Step 300: separating the magnetic iron oxide from the brine by magnetic adsorption, to obtain an iron-removed brine.

In the present disclosure, the brine includes one or more of salt lake brine or geothermal brine. In some embodiments, the brine includes geothermal brine. The geothermal brine itself has thermal energy, and has a temperature reaching 150° C. or higher. For geothermal brine with a temperature of 90° C. or higher, the temperature of geothermal brine is maintained at 75° C.-90° C. by cooling, and for geothermal brine with a temperature of 75° C. or lower, the temperature of geothermal brine is maintained at 75° C.-90° C. by heating. Therefore, when removing iron from geothermal brine, energy consumption for heating brine can be reduced, and the conversion of iron into magnetic iron oxide is realized by using the temperature condition of the geothermal brine itself. This greatly improves the utilization of resources. In an embodiment of the present disclosure, the temperature of the brine is 75° C.-90° C. The temperature of the brine can be, but not limited to, 75° C., 80° C., 83° C., 85° C., 87° C. or 90° C. When the temperature of brine is higher than 90° C., the brine evaporates too quickly, and other ions in brine such as manganese ions are easy to precipitate. As a result, the magnetic iron oxide collected subsequently is mixed with manganese dioxide precipitate, increasing the complexity in iron recovery. When the temperature of brine is lower than 75° C., the ferrous ions cannot be efficiently converted into magnetic iron oxide. In some embodiments of the present disclosure, the temperature of brine is 85° C.-90° C. Under this temperature condition, ferrous ions can be rapidly converted into magnetic iron oxide, to shorten the reaction time, and speed up the process. In the present disclosure, the temperature of brine can be adjusted to 75° C.-90° C. before or after the pH adjusting agent is added, as long as the brine temperature is 75° C.-90° C. when the oxygen-containing gas is introduced.

In an embodiment of the present disclosure, a pH adjusting agent is added to the brine, and the pH adjusting agent includes one or more of sodium hydroxide, potassium hydroxide or aqueous ammonia. In some embodiments, the pH adjusting agent includes sodium hydroxide. During the process of iron removal from brine, due to the continuous evaporation of water, sodium chloride in brine is evolved to form a precipitate. The precipitate can be recovered to produce table salt. When sodium hydroxide is used to adjust the pH of brine, the yield of sodium chloride, the by-product of iron removal from brine, can be greatly improved, to realize the full utilization of each component in the brine. In an embodiment of the present disclosure, after the pH adjusting agent is added, the pH of the brine is greater than or equal to 6.0 and less than or equal to 7.0. The pH of the brine can be, but not limited to, 6.0, 6.1, 6.2, 6.3, 6.4, 6.5, 6.6, 6.7, 6.8 or 7.0. When the pH of brine is greater than 7.0, manganese ions and magnesium ions in the brine are precipitated. On the one hand, the precipitation of manganese ions and magnesium ions may lead to the entrainment of precipitates of manganese ions and magnesium ions, such as $MnO_2$ and $Mg(OH)_2$ in the subsequently separated magnetic iron oxide and sodium chloride precipitate, which is not conducive to the separation of various elements in brine. On the other hand, the precipitates of manganese ions and magnesium ions may adsorb lithium ions in brine, leading to the reduction of lithium ion content in brine, and a low yield of lithium in the subsequent brine extraction process. When the pH of brine is less than 6.0, the acidity of the solution is too high, and iron is converted into an amorphous iron oxide. As a result, the iron in the brine cannot be fully separated by magnetic adsorption, and the separation efficiency is reduced. In some embodiments of the present disclosure, the pH of the brine can be adjusted to 6.3-6.8. When the pH of the brine is adjusted to 6.3-6.8, the conversion rate of iron element to form magnetic iron oxide is high, and other metal ions in the brine are not easy to precipitate, so sufficient separation of the iron element in brine can be achieved.

In the present disclosure, the control of the pH of the brine ensures the fully conversion of the iron element into magnetic iron oxide, and the setting of the pH value is also relevant to the subsequent extraction of lithium from brine. During the process of iron removal from brine, the pH of the brine changes, for example, when the oxygen-containing gas is introduced into the brine, ferrous ions in brine undergo the following reactions:

$$Fe^{2+} + 3O_2 + H_2O \rightarrow Fe(OH)_3 + Fe^{3+}$$

$$Fe^{3+} + OH^- \rightarrow Fe(OH)_3$$

$$Fe^{2+} + Fe(OH)_3 + OH^- \xrightarrow{\triangle} Fe(OH)_3$$

After the above reactions are completed, the pH of the brine decreases. At present, commercially available lithium adsorbents mainly include aluminum-based adsorbents and manganese-based adsorbents, which are used at a pH in the range of 4-7. In the present disclosure, to optimize the process of extracting lithium from brine, and ensure that the brine can be directly used for lithium adsorption after iron removal, the pH of the brine is controlled to 6.0-7.0 in the process of iron removal from brine. Under this pH condition, the pH of the iron-removed brine obtained after the reaction is consistent with the applicable pH of the adsorbent. That is, there is no need to adjust the pH of the iron-removed brine again, and the iron-removed brine can be directly adsorbed. In some embodiments of the present disclosure, after the iron removal process, the pH of the iron-removed brine is 4.5-6.0. After the iron removal process, the pH of the iron-removed brine can be, but not limited to, 4.5, 4.7, 5.0, 5.2, 5.5, 5.7 or 6.0.

In Step 200, when an oxygen-containing gas is introduced into the brine, the oxygen-containing gas can be oxygen or an oxygen-containing mixed gas. For example, the oxygen-containing gas can be air, or pure oxygen. When air is used as the oxygen-containing gas, the cost of the iron removal process is low. In the present disclosure, the oxygen-containing gas includes oxygen molecules. In some embodiments, based on one mole of iron element in the brine, the oxygen molecules are introduced in an amount of 250-540 mol. The amount of oxygen molecules introduced refers to the total amount of oxygen molecules introduced into the brine. For example, when the total amount of iron in the brine is 1 mol, the molar amount of oxygen molecules introduced is 250-540 mol, and when the total amount of iron in the brine is 2 mol, the molar amount of oxygen molecules introduced is 500-1080 mol. Based on one mole of iron in the brine, the amount of oxygen molecules introduced can be, but not limited to, 250 mol, 280 mol, 300 mol, 400 mol or 540 mol. When the amount of oxygen molecules is controlled to be in the above range, the ferrous ions can be fully converted into magnetic iron oxide, whereby they can be quickly separated from the brine by magnetic separation technology, to reduce the iron content in the brine, and ensure the smooth progress of the subsequent lithium extraction process by adsorption.

In some embodiments of the present disclosure, based on one mole of iron element in the brine, the oxygen molecules are introduced in a rate of 4.5-10 mol/min. The rate of introducing oxygen molecules refers to the amount of oxygen molecules introduced per minute. For example, when the total amount of iron in the brine is 1 mol, the molar amount of oxygen molecules introduced into the brine is 4.5-10 mol in 1 minute, and when the total amount of iron in the brine is 2 mol, the molar amount of oxygen molecules introduced is 18-40 mol in 2 minutes. Based on one mole of iron element in the brine, the rate of introducing oxygen molecules into the brine can be, but not limited to, 4.5 mol/min, 5 mol/min, 6 mol/min, 8 mol/min or 10 mol/min. The utilization of oxygen molecules in the oxygen-containing gas can be enhanced and the oxygen molecules are ensured to fully react with the ferrous ions in brine by controlling the rate of introducing oxygen molecules, to achieve a good oxidation effect, inhibit the acidification of the brine, and ensure that the ferrous ions in the brine can be fully converted into magnetic iron oxide, thereby realizing the effective separation of iron in the brine. In some embodiments of the present disclosure, based on one mole of iron element in the brine, the oxygen molecule is introduced in a rate of 4.5-8 mol/min.

In Step 300 in the present disclosure, the magnetic iron oxide is separated from the brine by magnetic adsorption, to obtain an iron-removed brine. In some embodiments of the present disclosure, the magnetic iron oxide is separated from the brine by a magnetic separator having a magnetic field strength of greater than or equal to 3000 Gs (gauss). The magnetic field strength of the magnetic separator can be, but not limited to, 3000 Gs, 5000 Gs, 8000 Gs, 10000 Gs, 13000 Gs, 15000 Gs, 20000 Gs or 30000 Gs. In some embodiments of the present disclosure, the stirring speed of the magnetic separator is 15-50 r/min. In some embodiments of the present disclosure, the magnetic separator can operate simultaneously with the introduction of oxygen-containing gas, that is, when the oxygen-containing gas is introduced, the magnetic separator is used to stir the brine. This method can increase the rate of the reaction, to reduce the time of the iron removal process.

In some embodiments of the present disclosure, after the iron-removed brine is obtained, the iron-removed brine is filtered to obtain sodium chloride. During the iron removal process, due to the high temperature of the brine, the brine is continuously evaporated, and sodium chloride in the brine is evolved to form a precipitate due to supersaturation. In the present disclosure, the magnetic iron oxide is separated from the precipitate by magnetic separation technology, and the remaining precipitate is substantially sodium chloride. By filtering the iron-removed brine, the obtained precipitate is crude sodium chloride. The crude sodium chloride can be used as a by-product of the present disclosure, which can be purified later to obtain table salt.

In the method for separating iron element in brine provided in the present disclosure, the pH and temperature of the brine are adjusted, so that the iron element in the brine can be fully converted into magnetic iron oxide, and then the magnetic iron oxide is separated by magnetic separation technology, to realize the recovery of iron in brine. In the method, instead of pre-oxidizing the ferrous ions with an agent, the ferrous ions can be efficiently and quickly oxidized by introducing an oxygen-containing gas in the reaction process, and the oxidation of ferrous ions and the production of magnetic iron oxide occur at the same time, thus saving the reaction time. The method has simple operations, has no impact on lithium content in the brine, and can afford the by-product sodium chloride.

The present disclosure further provides an iron-removed brine obtained by the method for separating iron element in brine, which can be directly used in the extraction process of lithium by the adsorption method, thus simplifying the extraction process of lithium from brine, and improving the extraction efficiency of lithium in brine.

The present disclosure further provides an application of the method for separating iron element in brine, such as the extraction of lithium from brine. The method for separating iron element in brine provided in the present disclosure is applicable to the extraction process of lithium from brine. The adsorbent can be ensured to fully absorb the lithium ions in the brine by pretreatment of the brine to remove iron element therein, so as to achieve efficient lithium extraction.

The technical solution of the present disclosure is further described in several examples below. The same geothermal brine is tested in Examples 1-9 and Comparative Examples 1-4. The total weight of geothermal brine is 1.2 kg, and the contents of various element in the geothermal brine used are shown in Table 1.

TABLE 1

Contents of elements in geothermal brine in
Examples 1-9 and Comparative Examples 1-4

| Element | Content (%) |
| --- | --- |
| B | 0.0346 |
| K | 1.776 |
| Ca | 2.828 |
| Li | 0.022 |
| Mg | 0.0062 |
| Na | 7.134 |
| Ba | 0.0089 |
| Fe | 0.091 |
| Mn | 0.1045 |
| Pb | 0.0057 |
| Sr | 0.0549 |
| Zn | 0.0292 |
| Cl | 18.2831 |

It can be seen from Table 1 that the total amount of the iron element in the geothermal brine is 1.092 g, i.e. 0.0195 mol, and the total amount of the lithium element in the geothermal brine is 0.264 g.

Example 1

A method for separating iron element in brine includes the following steps.

1) The geothermal brine was cooled to 90° C. and held at this temperature.

2) The pH of the geothermal brine was adjusted to 6.5 with NaOH, and an oxygen-containing gas including oxygen molecules was introduced into the geothermal brine. Relative to one mole of iron element in the brine, the oxygen molecule was introduced in an amount of 287 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 49.73 g of sodium chloride per liter of brine was recovered.

Example 2

A method for separating iron element in brine includes the following steps.

1) The geothermal brine was cooled to 80° C. and held at this temperature.

2) The pH of the geothermal brine was adjusted to 6.5 with NaOH, and an oxygen-containing gas including oxygen molecules was introduced into the geothermal brine. Relative to one mole of iron element in the brine, the oxygen molecule was introduced in an amount of 287 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 44.02 g of sodium chloride per liter of brine was recovered.

Example 3

A method for separating iron element in brine includes the following steps.

1) The geothermal brine was cooled to 90° C. and held at this temperature.

2) The pH of the geothermal brine was adjusted to 6.5 with NaOH, and an oxygen-containing gas including oxygen molecules was introduced into the geothermal brine. Relative to one mole of iron element in the brine, the oxygen molecule was introduced in an amount of 574 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 58.16 g of sodium chloride per liter of brine was recovered.

Example 4

A method for separating iron element in brine includes the following steps.

1) The geothermal brine was cooled to 90° C. and held at this temperature.

2) The pH of the geothermal brine was adjusted to 6.3 with NaOH, and an oxygen-containing gas including oxygen molecules was introduced into the geothermal brine. Relative to one mole of iron element in the brine, the oxygen molecule was introduced in an amount of 287 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 46.77 g of sodium chloride per liter of brine was recovered.

Example 5

A method for separating iron element in brine includes the following steps.

1) The geothermal brine was cooled to 90° C. and held at this temperature.

2) The pH of the geothermal brine was adjusted to 6.8 with NaOH, and an oxygen-containing gas including oxygen molecules was introduced into the geothermal brine. Relative to one mole of iron element in the brine, the oxygen molecule was introduced in an amount of 287 mol, and at a rate of 4.79 mol/min.

3) A magnetic rod with a field magnetic strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 50.37 g of sodium chloride per liter of brine was recovered.

Example 6

A method for separating iron element in brine includes the following steps.

1) The geothermal brine was cooled to 90° C. and held at this temperature.

2) The pH of the geothermal brine was adjusted to 6.8 with NaOH, and an oxygen-containing gas including oxygen molecules was introduced into the geothermal brine. Relative to one mole of iron element in the brine, the oxygen molecule was introduced in an amount of 287 mol, and at a rate of 14.36 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 52.56 g of sodium chloride per liter of brine was recovered.

Example 7

A method for separating iron element in brine includes the following steps.

1) The geothermal brine was cooled to 90° C. and held at this temperature.

2) The pH of the geothermal brine was adjusted to 6.5 with NaOH, and an oxygen-containing gas including oxygen molecules was introduced into the geothermal brine. Relative to one mole of iron element in the brine, the oxygen molecule was introduced in an amount of 173 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 46.77 g of sodium chloride per liter of brine was recovered.

Example 8

A method for separating iron element in brine includes the following steps.

1) The geothermal brine was cooled to 90° C. and held at this temperature.

2) The pH of the geothermal brine was adjusted to 6.5 with NaOH, and an oxygen-containing gas including oxygen molecules was introduced into the geothermal brine. Relative to one mole of iron element in the brine, the oxygen molecule was introduced in an amount of 287 mol, and at a rate of 1.91 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 51.21 g of sodium chloride per liter of brine was recovered.

Example 9

A method for separating iron element in brine includes the following steps.

1) The geothermal brine was cooled to 90° C. and held at this temperature.

2) The pH of the geothermal brine was adjusted to 6.0 with NaOH, and an oxygen-containing gas including oxygen molecules was introduced into the geothermal brine. Relative to one mole of iron element in the brine, the oxygen molecule was introduced in an amount of 287 mol, and at a rate of 4.79 mol/min.

3) A magnetic rod with a magnetic field strength of 8000 Gs was inserted into the geothermal brine obtained from step 2) and the geothermal brine was stirred for magnetic separation to obtain magnetite $Fe_3O_4$ and an iron-removed brine. The magnetite $Fe_3O_4$ on the magnetic rod was washed with water to wash away the NaCl inclusions, where the weight ratio of water to wet $Fe_3O_4$ was 60:1. The washed magnetite $Fe_3O_4$ was dried at 90° C.

4) After the iron-removed brine was cooled down, the iron-removed brine was filtered to obtain crude sodium chloride and refined brine. The crude sodium chloride was dissolved in water at a weight ratio of 1:5 and filtered, and then the filtrate was dried to obtain white crystalline sodium chloride. 48.94 g of sodium chloride per liter of brine was recovered.

To highlight the beneficial effects of the present disclosure, the following comparative examples are provided.

Comparative Example 1

Comparative Example 1 differed from Example 1 in that the temperature of the geothermal brine in Comparative Example 1 was 105° C. In the method of Comparative Example 1, 66.92 g of sodium chloride per liter of brine was recovered.

Comparative Example 2

Comparative Example 2 differed from Example 1 in that the temperature of the geothermal brine in Comparative Example 2 was 70° C. A brown precipitate and white crystal were formed at the bottom of the brine. Since the resulting precipitate is non-magnetic, the brown precipitate and the white crystals (NaCl) were filtered to obtain a wet precipitate. The wet precipitate was dissolved in water at a weight ratio of 1:5 and separated to obtain a brown precipitate and a filtrate A. The residual NaCl in the brown precipitate was washed off with water, where the weight ratio of water to the brown precipitate was 60:1. The washed brown precipitate was dried at 90° C. to obtain an iron-containing precipitate. The filtrate A was dried to obtain sodium chloride. In the method of Comparative Example 2, 35.08 g of sodium chloride per liter of brine was recovered.

Comparative Example 3

Comparative Example 3 differed from Example 1 in that pH of the geothermal brine was adjusted to 9.0 with NaOH in Comparative Example 3. A brown precipitate and white crystal were formed at the bottom of the brine. Since the resulting precipitate is non-magnetic, it could only be separated by filtration. The step of separation by filtration was the same as that in Comparative Example 2. In the method of Comparative Example 3, 54.52 g of sodium chloride per liter of brine was recovered.

Comparative Example 4

Comparative Example 4 differed from Example 1 in that pH of the geothermal brine was adjusted to 5.5 with NaOH in Comparative Example 4. A brown precipitate and white crystal were formed at the bottom of the brine. Since the resulting precipitate is non-magnetic, it could only be separated by filtration. The step of separation by filtration was the same as that in Comparative Example 3. In the method of Comparative Example 4, 43.95 g of sodium chloride per liter of brine was recovered.

Effect Examples

To provide support for the effect brought by the technical solutions in the embodiments of the present disclosure, the following tests were provided.

The pH values of the refined brine obtained in Examples 1-9 and Comparative Examples 1-4 were tested. The test results are shown in Table 2.

TABLE 2

| Summary of pH values of the refined brine obtained in Examples 1-9 and Comparative Examples 1-4 | |
|---|---|
| Experimental group | pH |
| Example 1 | 5.18 |
| Example 2 | 5.12 |
| Example 3 | 4.11 |
| Example 4 | 4.97 |
| Example 5 | 5.37 |
| Example 6 | 5.42 |
| Example 7 | 5.42 |
| Example 8 | 4.05 |
| Example 9 | 4.02 |
| Comparative Example 1 | 5.33 |
| Comparative Example 2 | 5.48 |
| Comparative Example 3 | 8.46 |
| Comparative Example 4 | 3.21 |

It can be seen from Table 2 that the pH values of the refined brine obtained in Examples 1-9 are in the range of 4.0-5.5, meeting the requirements in adsorption by the adsorbent. The brine can be directly used in the subsequent process of adsorption of lithium ions by the adsorbent. In Comparative Example 3, the pH of the brine is adjusted to 9.0. Due to the too high initial pH of the brine, the pH of the resulting refined brine is greater than 8, so the refined brine cannot be directly used in the process of extracting lithium from brine. In Comparative Example 4, the pH of the brine is adjusted to 5.5. Due to the too low initial pH of the brine, the pH of the resulting refined brine is lower than 4.0, so the refined brine cannot be directly used in the process of extracting lithium from brine.

The contents of various elements in the refined brine of Examples 1-9 and Comparative Examples 1-4 were tested by inductively coupled plasma optical emission spectrometer (ICP-OES). The test results are shown in Tables 3, 4 and 5. Table 3 shows the contents of elements in refined brine obtained in Examples 1-4. Table 4 shows the contents of elements in refined brine obtained in Examples 5-9. Table 5 shows the contents of elements in refined brine obtained in Comparative Examples 1-4. In the table, N.D. indicates that the content of the element in the sample is below the detection limit of the instrument.

TABLE 3

Contents of elements in refined brine obtained in Examples 1-4

| | Experimental group | | | |
|---|---|---|---|---|
| Element | Example 1 | Example 2 | Example 3 | Example 4 |
| B (%) | 0.0391 | 0.0386 | 0.0405 | 0.0391 |
| K (%) | 2.041 | 1.9799 | 2.0932 | 2.0231 |
| Ca (%) | 3.1232 | 3.1231 | 3.2893 | 3.1891 |
| Li (%) | 0.0257 | 0.0246 | 0.026 | 0.0253 |
| Mg (%) | 0.0074 | 0.0069 | 0.0073 | 0.0071 |
| Na (%) | 6.1124 | 6.0361 | 6.2359 | 6.2115 |
| Ba (%) | 0.0102 | 0.0098 | 0.0099 | 0.0094 |
| Fe (%) | N.D. | 0.0032 | N.D. | N.D. |
| Mn (%) | 0.1192 | 0.1158 | 0.1208 | 0.1189 |
| Pb (%) | 0.0061 | 0.0059 | 0.0064 | 0.0061 |
| Sr (%) | 0.0633 | 0.0612 | 0.0671 | 0.0627 |
| Zn (%) | 0.0328 | 0.0323 | 0.0331 | 0.0329 |
| Cl (%) | 19.0255 | 19.4771 | 19.574 | 19.0256 |

TABLE 4

Contents of elements in refined brine obtained in Examples 5-9

| | Experimental group | | | | |
|---|---|---|---|---|---|
| Element | Example 5 | Example 6 | Example 7 | Example 8 | Example 9 |
| B (%) | 0.0398 | 0.0389 | 0.0381 | 0.0450 | 0.0391 |
| K (%) | 2.0423 | 1.9989 | 1.9112 | 2.3088 | 2.0069 |
| Ca (%) | 3.2311 | 3.1563 | 2.9987 | 3.6473 | 3.1956 |
| Li (%) | 0.0253 | 0.0251 | 0.0244 | 0.0286 | 0.0249 |
| Mg (%) | 0.0073 | 0.0071 | 0.0063 | 0.0080 | 0.0070 |
| Na (%) | 6.0687 | 5.8907 | 5.9231 | 6.2351 | 6.2200 |
| Ba (%) | 0.0092 | 0.0101 | 0.0095 | 0.0116 | 0.0101 |
| Fe (%) | N.D. | 0.0047 | 0.0106 | 0.0161 | 0.0129 |
| Mn (%) | 0.1182 | 0.1172 | 0.1104 | 0.1302 | 0.1181 |
| Pb (%) | 0.0060 | 0.0062 | 0.0059 | 0.0073 | 0.0064 |
| Sr (%) | 0.0632 | 0.0620 | 0.0588 | 0.0714 | 0.0620 |
| Zn (%) | 0.0330 | 0.0321 | 0.0324 | 0.0380 | 0.0330 |
| Cl (%) | 19.0133 | 18.998 | 19.0255 | 19.3346 | 19.6599 |

It can be seen from Tables 3 and 4 that the content of iron ions in the refined brine obtained in Examples 1-9 is greatly reduced compared with the content of iron ions in the initial geothermal brine. In addition, in the obtained refined brine, the contents of some elements that are not involved in the reaction such as boron, potassium, calcium, lithium, magnesium and other elements are increased, because the temperature of the geothermal brine is high during the iron removal process, and water is evaporated constantly, so the contents of some elements in the refined brine is higher than that in the initial geothermal brine. The content of iron in the obtained refined brine obtained in Examples 1, 3, 4 and 5 is lower than the detection limit. Although some iron remains in the obtained refined brine obtained in Examples 2 and 6-9, the content of iron is lower than 0.02%. In the brine system, iron of this content has almost no influence on the lithium extraction effect of the adsorbent, thus ensuring that the adsorbent can effectively adsorb lithium ions.

TABLE 5

Contents of elements in refined brine
obtained in Comparative Examples 1-4

| | Experimental group | | | |
|---|---|---|---|---|
| Element | Comparative Example 1 | Comparative Example 2 | Comparative Example 3 | Comparative Example 4 |
| B (%) | 0.0477 | 0.0367 | 0.0375 | 0.0400 |
| K (%) | 2.4296 | 1.8826 | 1.9454 | 2.0532 |

TABLE 5-continued

Contents of elements in refined brine
obtained in Comparative Examples 1-4

| | Experimental group | | | |
|---|---|---|---|---|
| Element | Comparative Example 1 | Comparative Example 2 | Comparative Example 3 | Comparative Example 4 |
| Ca (%) | 3.6021 | 2.9977 | 2.8922 | 3.2694 |
| Li (%) | 0.0291 | 0.0233 | 0.022 | 0.0254 |
| Mg (%) | 0.0079 | 0.0066 | 0.0055 | 0.0072 |
| Na (%) | 6.2358 | 6.2131 | 6.3821 | 6.1231 |
| Ba (%) | 0.0101 | 0.0094 | 0.0081 | 0.0103 |
| Fe (%) | N.D. | 0.0281 | N.D. | 0.0485 |
| Mn (%) | 0.0879 | 0.1108 | N.D. | 0.1208 |
| Pb (%) | 0.0061 | 0.0060 | 0.0006 | 0.0066 |
| Sr (%) | 0.0751 | 0.0582 | 0.0583 | 0.0635 |
| Zn (%) | 0.0328 | 0.0310 | N.D. | 0.0338 |
| Cl (%) | 20.921 | 19.3801 | 17.9255 | 19.7365 |

It can be seen from Table 5 that the content of iron in the refined brine obtained in Comparative Examples 1 and 3 is below the detection limit. However, the methods of Comparative Examples 1 and 3 may lead to the reduction of lithium content in the refined brine. After the iron removal from the geothermal brine in Comparative Example 1, the amount of refined brine obtained is 852 g, and the amount of the lithium element in the refined brine after the reaction is 0.248 g. After the iron removal from the geothermal brine in Comparative Example 3, the amount of refined brine obtained is 1070 g, and the amount of the lithium element in the refined brine after the reaction is 0.235 g. This shows that the methods of Comparative Examples 1 and 3 cause the loss of lithium in the brine, which is not conducive to its use in the extraction of lithium from brine. In Comparative Example 2, the temperature of the geothermal brine is low, and the ferrous ions cannot react effectively to form magnetic iron oxide, causing poor iron removal. In Comparative Example 4, the pH of the geothermal brine is too low, and the ferrous ions cannot react effectively to form magnetic iron oxide, causing poor iron removal.

Figure 3:
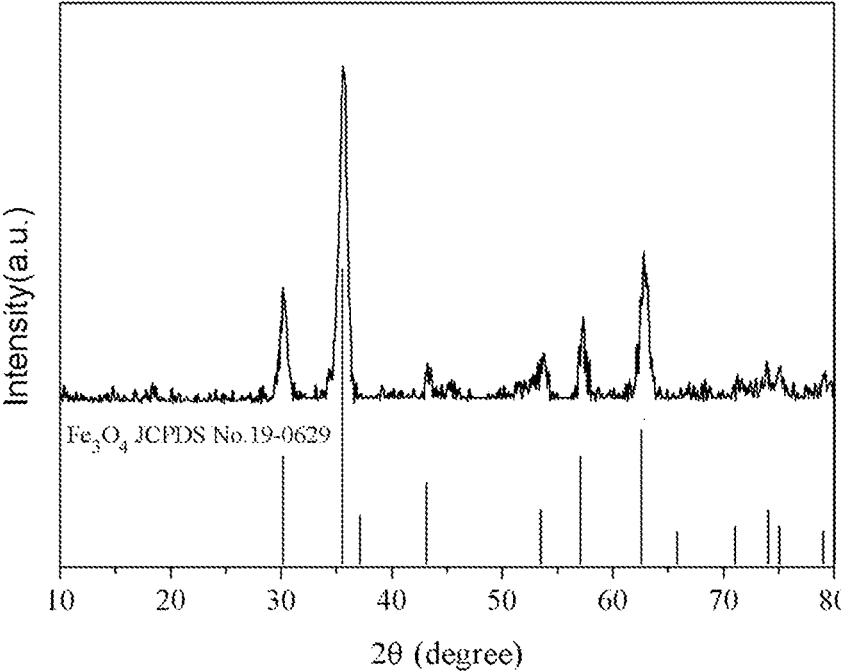
FIG. 3 is a diffraction pattern of a magnetite recovered in Example 2.
Figure 4:
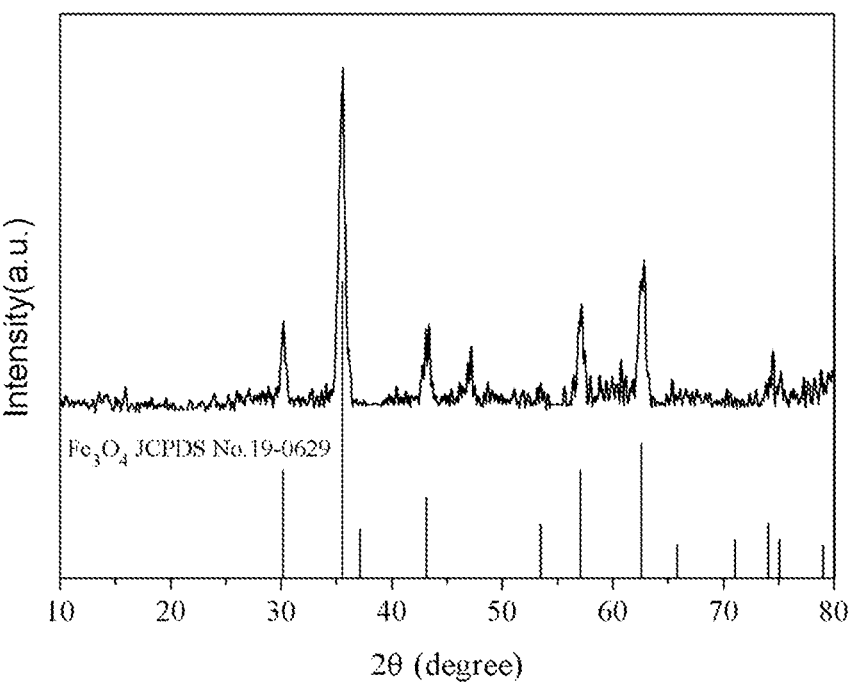
FIG. 4 is a diffraction pattern of a magnetite recovered in Example 3.
Figure 5:
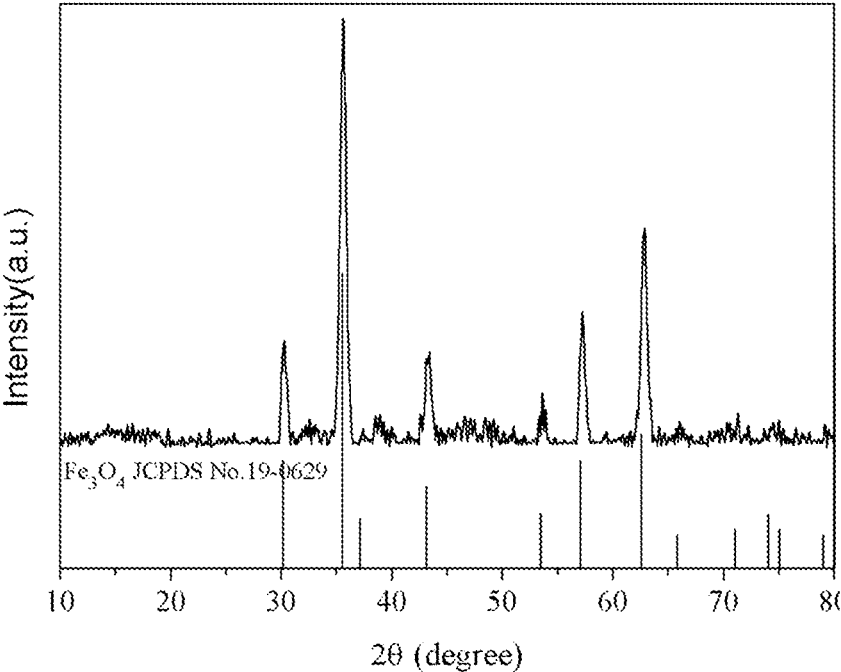
FIG. 5 is a diffraction pattern of a magnetite recovered in Example 4.
Figure 6:
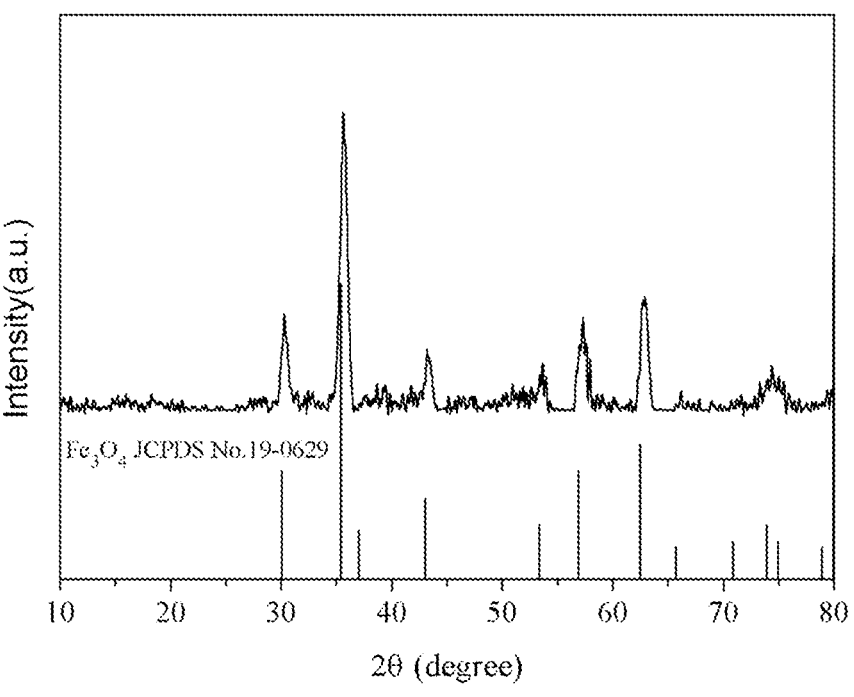
FIG. 6 is a diffraction pattern of a magnetite recovered in Example 5.
Figure 7:
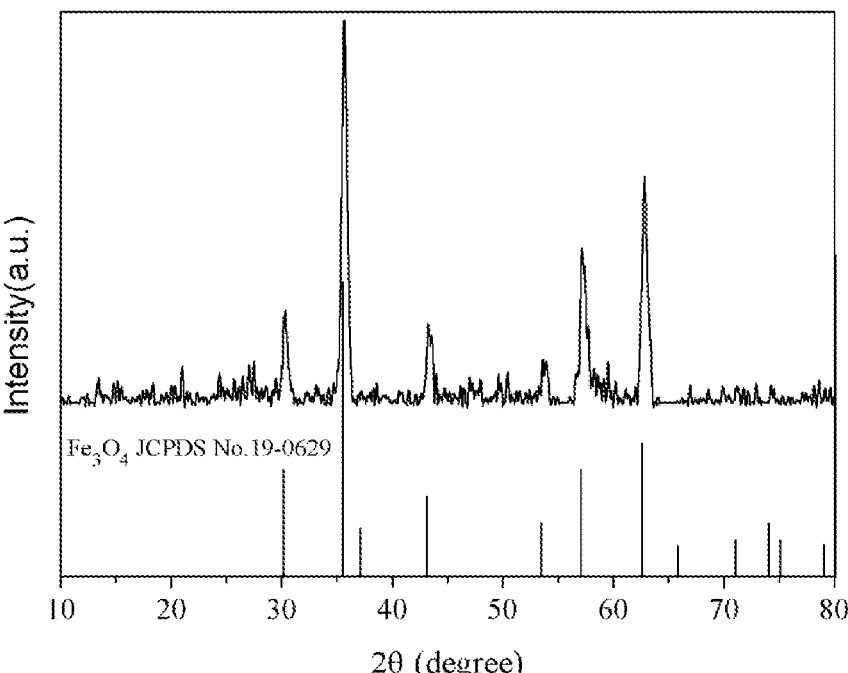
FIG. 7 is a diffraction pattern of a magnetite recovered in Example 6.
Figure 8:
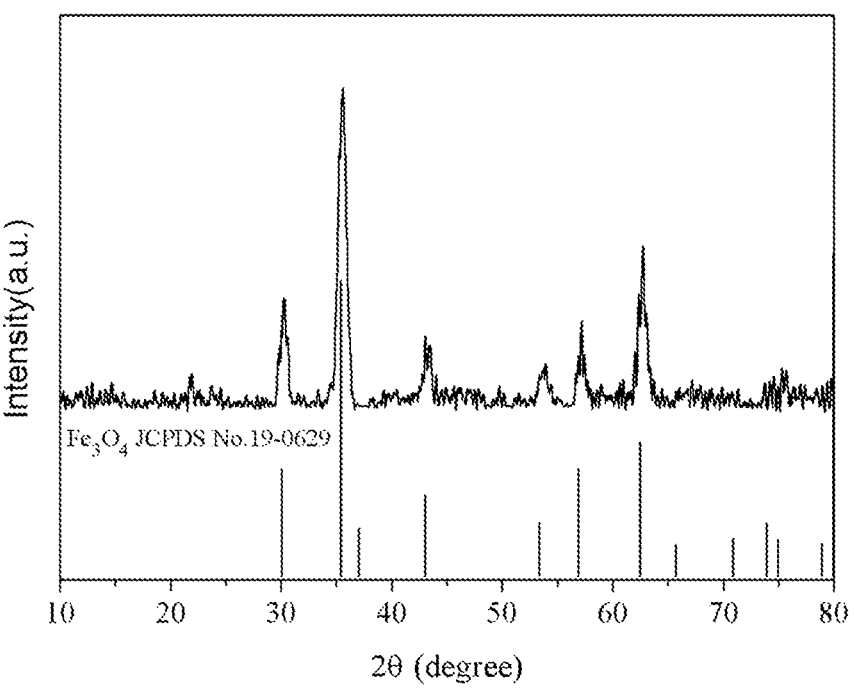
FIG. 8 is a diffraction pattern of a magnetite recovered in Example 7.
Figure 9:
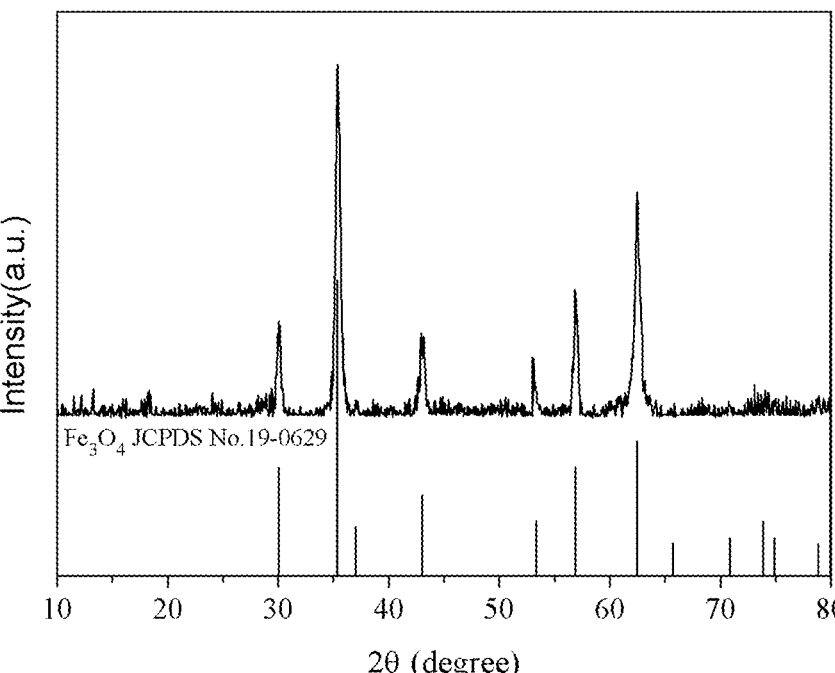
FIG. 9 is a diffraction pattern of a magnetite recovered in Example 8.
Figure 10:
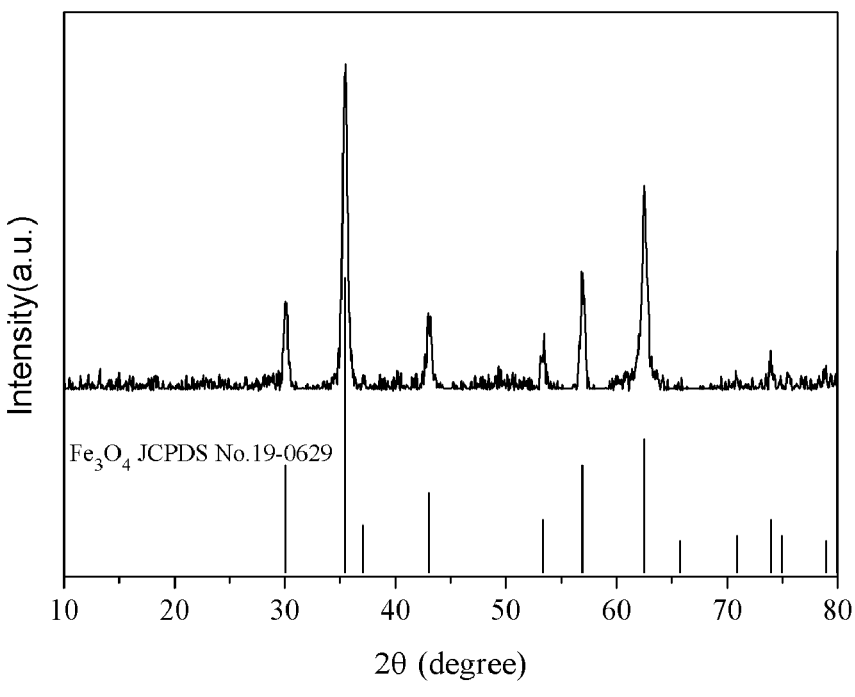
FIG. 10 is a diffraction pattern of a magnetite recovered in Example 9.
Figure 13:
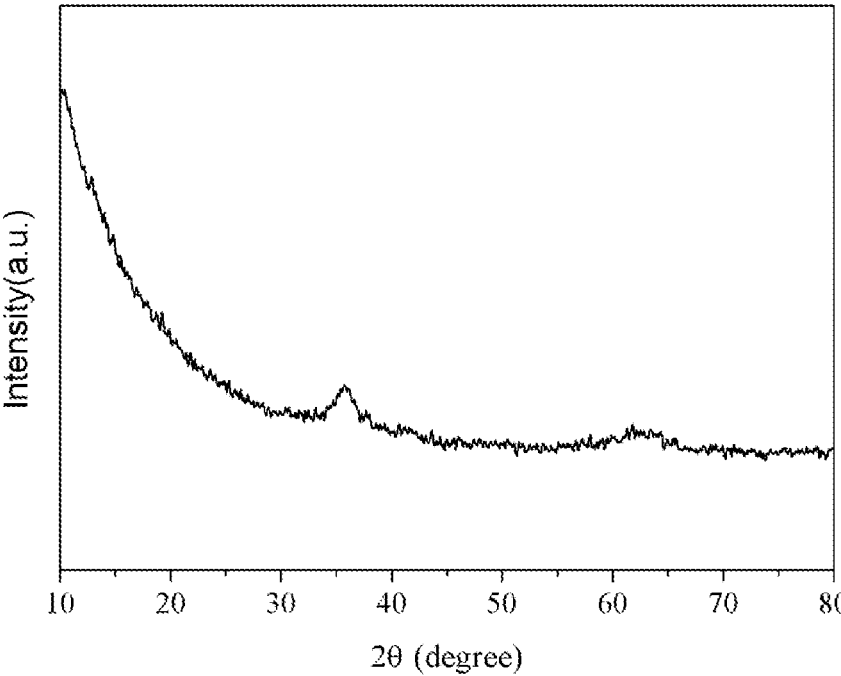
FIG. 13 is a diffraction pattern of a magnetite recovered in Comparative Example 3.
Figure 14:
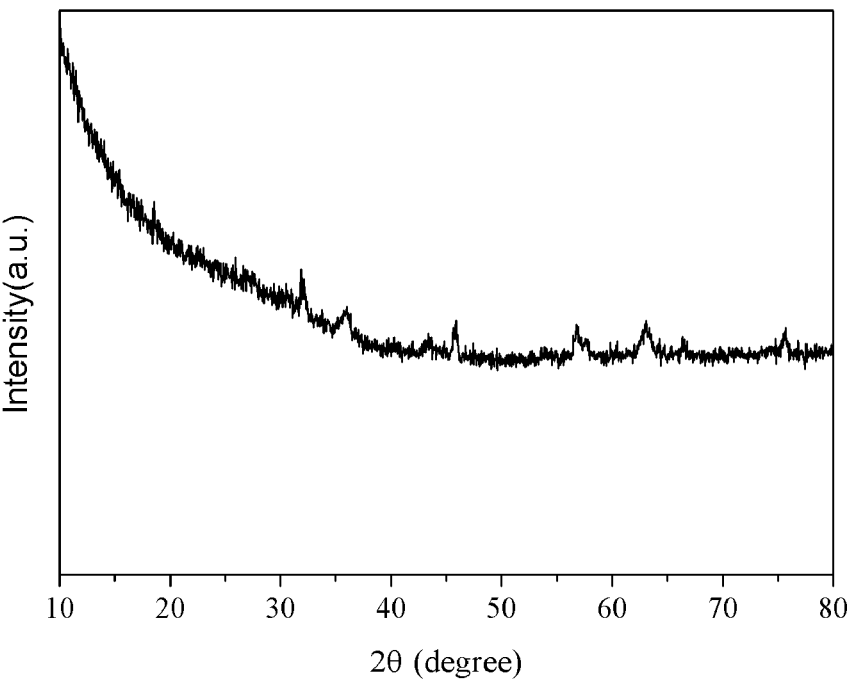
FIG. 14 is a diffraction pattern of a magnetite recovered in Comparative Example 4.

The magnetite collected with a magnetic rod in Examples 1-9 and Comparative Examples 1-4 were analyzed by X-ray diffraction (XRD), to evaluate the iron separation efficiency. Referring to FIGS. 2 to 14, FIG. 2 is a diffraction pattern of a magnetite recovered in Example 1, FIG. 3 is a diffraction pattern of a magnetite recovered in Example 2, FIG. 4 is a diffraction pattern of a magnetite recovered in Example 3, FIG. 5 is a diffraction pattern of a magnetite recovered in Example 4, FIG. 6 is a diffraction pattern of a magnetite recovered in Example 5, FIG. 7 is a diffraction pattern of a magnetite recovered in Example 6, FIG. 8 is a diffraction pattern of a magnetite recovered in Example 7, FIG. 9 is a diffraction pattern of a magnetite recovered in Example 8, FIG. 10 is a diffraction pattern of a magnetite recovered in Example 9, FIG. 11 is a diffraction pattern of a magnetite recovered in Comparative Example 1, FIG. 12 is a diffraction pattern of a magnetite recovered in Comparative Example 2, FIG. 13 is a diffraction pattern of a magnetite recovered in Comparative Example 3, and FIG. 14 is a diffraction pattern of a magnetite recovered in Comparative Example 4.

In FIGS. 2 to 14, the 2θ on the abscissa indicates the diffraction angle in degrees, and the intensity on the ordinate indicates the diffraction intensity. In FIGS. 2 to 8, the upper curve in the diffraction pattern is the diffraction curve of the recovered magnetite, the lower curve $Fe_3O_4$ JCPDS No. 19-0629 is a diffraction curve of the standard sample of magnetic iron oxide, and they are provided for sample comparison. As can be seen from FIGS. 2-10, the magnetite recovered in Examples 1-9 has consistent diffraction peaks with magnetic iron oxide, indicating that the recovered magnetite has a high purity. That is, by using this method, the iron element can be effectively converted into magnetic iron oxide and then separated from the brine, and the obtained magnetic iron oxide has a high purity, which is convenient for the recycling of iron.

Figure 11:
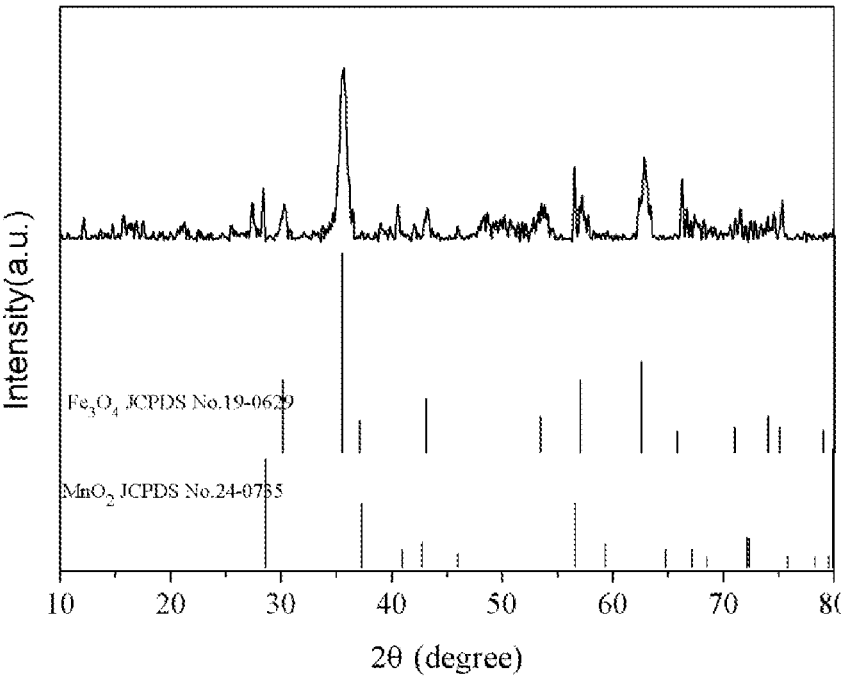
FIG. 11 is a diffraction pattern of a magnetite recovered in Comparative Example 1.

In FIG. 11, the top curve in the diffraction pattern is the diffraction curve of the recovered magnetite, the middle curve $Fe_3O_4$ JCPDS No. 19-0629 is a diffraction curve of the standard sample of magnetic iron oxide, and the bottom curve $MnO_2$ JCPDS No. 24-0755 is a diffraction curve of the standard sample of manganese dioxide. It can be seen from FIG. 11 that besides the characteristic peak of $Fe_3O_4$, the sample of Comparative Example 1 further includes the characteristic peaks of manganese dioxide and other impurities, indicating that the magnetite recovered by the method of Comparative Example 1 further comprise manganese dioxide and other impurities. This is due to that the temperature of the geothermal brine in Comparative Example 1 is too high, the brine evaporates too quickly, and other impurities in the geothermal brine are also precipitated accordingly. The existence of other impurities in magnetite leads to the need for subsequent removal of impurities in the recovered iron, which increases the process flow and production cost.

Figure 12:
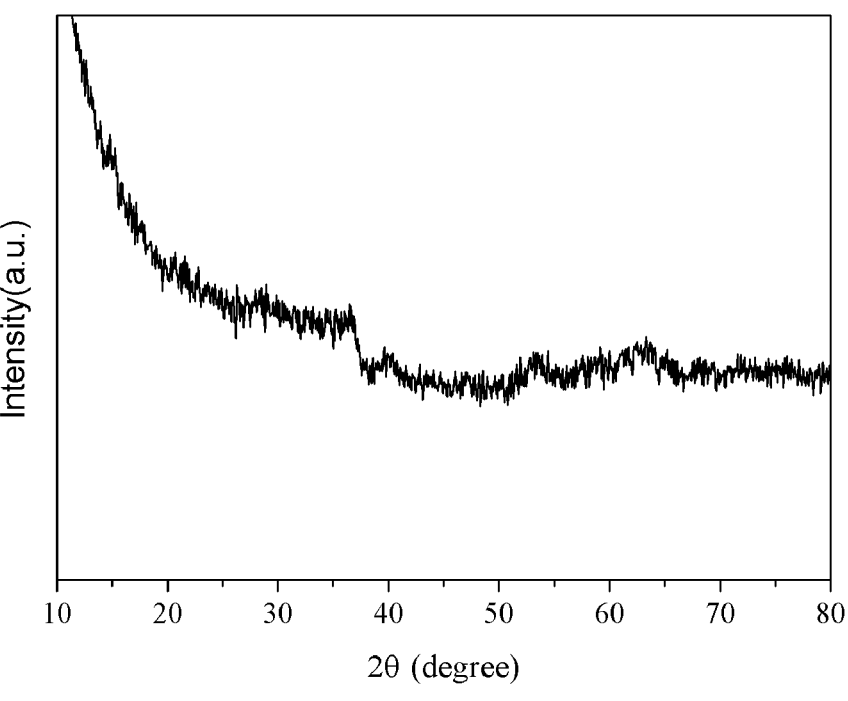
FIG. 12 is a diffraction pattern of a magnetite recovered in Comparative Example 2.

In FIG. 12, the sample recovered in Comparative Example 2 has no characteristic peaks, and is an amorphous precipitate. This is because the temperature of the brine in Comparative Examples 2 is too low, the conditions for the formation of $Fe_3O_4$ cannot be met, and the ferrous ions in the brine are mainly precipitated as amorphous iron oxide or hydroxide after being oxidized by oxygen. It can be seen from FIG. 13 that the sample recovered in Comparative Example 3 has no characteristic peaks, and is an amorphous precipitate. This is due to that the pH of the geothermal brine in Comparative Example 3 is too high, a variety of ions are precipitated in the brine. It can also be seen from the contents of elements in refined brine of Comparative Examples 3 shown in Table 5 above that the contents of manganese and zinc in the refined brine are both below the detection limits. That is, manganese and zinc are also precipitated in the iron removal process, and the precipitates of manganese and zinc may adsorb a certain amount of lithium. As a result, the content of lithium in the brine is reduced.

In FIG. 14, the sample recovered in Comparative Example 4 has a weak characteristic peak and almost no obvious characteristic peak, and is an amorphous precipitate. This is due to that the pH of the brine in Comparative Example 4 is too low, the conditions for the formation of $Fe_3O_4$ cannot be met, and the ferrous ions in the brine are mainly precipitated as amorphous iron oxide or hydroxide after being oxidized by the oxygen-containing gas.

Figure 15:
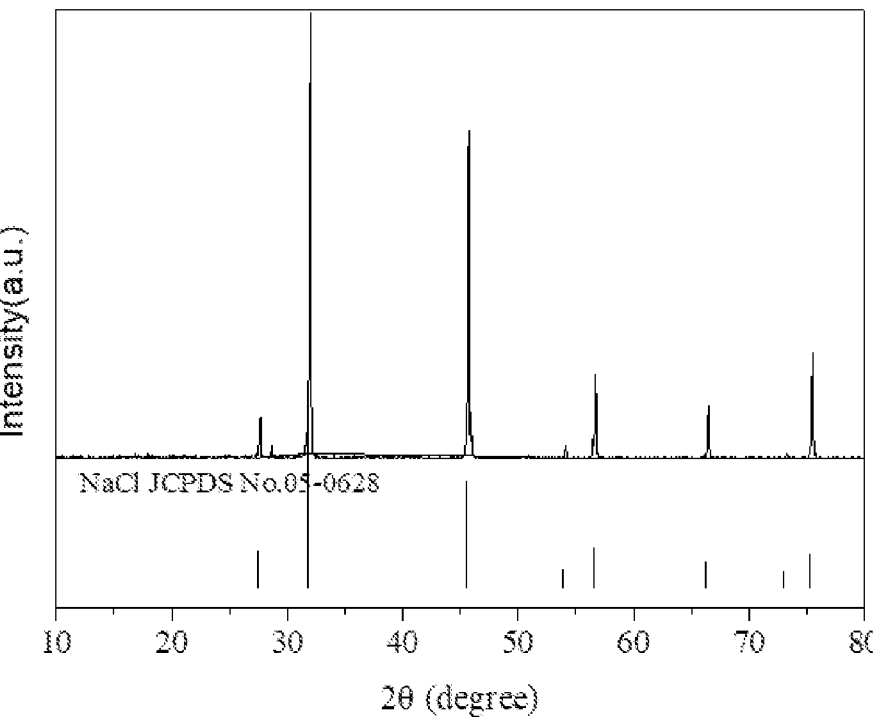
FIG. 15 is a diffraction pattern of sodium chloride recovered in Example 1.

4) The white crystalline sodium chloride obtained in Example 1 was analyzed by X-ray diffraction (XRD). The test results are shown in FIG. 15. FIG. 15 is a diffraction pattern of sodium chloride recovered in Example 1. In FIG. 15, the top curve in the diffraction pattern is a diffraction curve of the recovered white crystal, and the bottom curve NaCl JCPDS No. 05-0628 is a diffraction curve of the standard sample of sodium chloride. It can be seen from FIG. 15 that the sodium chloride recovered in Example 1 has a high purity. This suggests that with the method for separating iron element in brine provided in the present disclosure, by-product sodium chloride can also be obtained. The impurities in the crude sodium chloride are less, and high-purity sodium chloride can be obtained by simple dissolution and filtration. The present disclosure is beneficial to the full use of brine, and can obtain the by-product from brine conveniently.

In summary, it can be seen from the above experimental results that by using method for separating iron element in brine provided in the present disclosure, the iron element can be quickly and efficiently separated from the brine, and the separated magnetite can be directly recycled. The resulting iron-removed brine has a moderate pH and can be directly used in the subsequent lithium extraction process. In the method, by-product sodium chloride can also be obtained, which is conducive to the full utilization of brine resources.

The foregoing descriptions are merely exemplary implementations of the present disclosure, but they are not to be construed as a limit to the scope of the present disclosure. It should be noted that a person of ordinary skill in the art may make several improvements and modifications without departing from the principle of the present disclosure. All such modifications and modifications shall fall within the protection scope of the present disclosure.

What is claimed is:

1. A method for separating iron element in brine, comprising:

adding a pH adjusting agent to the brine to adjust pH of the brine to 6.0-7.0, and controlling a temperature of the brine to 75° C.-90° C.;

introducing an oxygen-containing gas into the brine, to covert the iron element in the brine into magnetic iron oxide, wherein the oxygen-containing gas comprises oxygen molecules, and based on one mole of iron in the brine, the oxygen molecules are configured to be introduced in an amount of 250-540 mol and at a rate of 4.5-10 mol/min to fully convert ferrous ions in the brine into the magnetic iron oxide; and separating the magnetic iron oxide from the brine by magnetic adsorption, to obtain an iron-removed brine, and to recover magnetite by a magnetic separator, wherein the magnetic separator is configured to stir the brine simultaneously with the introducing of the oxygen-containing gas, wherein the iron-removed brine is directly used in an extraction process of lithium without adjusting pH of the iron-removed brine, and wherein the recovered magnetite has diffraction peaks that are consistent with diffraction peaks of magnetic iron oxide.

2. The method according to claim 1, wherein the pH of the brine is adjusted to 6.3-6.8.

3. The method according to claim 1, wherein the temperature of the brine is controlled to be 85° C.-90° C.

4. The method according to claim 1, wherein the pH adjusting agent comprises one or more of sodium hydroxide, potassium hydroxide, or aqueous ammonia.

5. The method according to claim 1, further comprising: filtering the iron-removed brine to obtain sodium chloride.

6. The method according to claim 1, wherein pH of the iron-removed brine is 4.5-6.0.

7. The method according to claim 1, wherein the brine comprises geothermal brine.

* * * * *